(12) United States Patent  
Appleby et al.

(10) Patent No.: US 7,824,595 B2  
(45) Date of Patent: Nov. 2, 2010

(54) METHOD AND SYSTEM FOR CAST MOLDING A FLUID CONDUIT

(75) Inventors: Robert Appleby, Watertown, TN (US); Glen Pfanner, Gallatin, TN (US); Billy Ervin, Lebanon, TN (US)

(73) Assignee: Perma-Pipe, Inc., Niles, IL (US)

( * ) Notice: Subject to any disclaimer, the term of this patent is extended or adjusted under 35 U.S.C. 154(b) by 1085 days.

(21) Appl. No.: 11/137,626

(22) Filed: May 25, 2005

(65) Prior Publication Data

US 2006/0032588 A1 Feb. 16, 2006

Related U.S. Application Data

(60) Provisional application No. 60/601,470, filed on Aug. 13, 2004.

(51) Int. Cl.  
*B32B 37/00* (2006.01)

(52) U.S. Cl. ............... 264/316; 264/262; 264/271.1; 138/145

(58) Field of Classification Search ......... 264/316, 264/271.1, 313, 262; 138/145  
See application file for complete search history.

(56) References Cited

U.S. PATENT DOCUMENTS

| | | | |
|---|---|---|---|
| 1,796,691 A | 3/1931 | Jansen | |
| 1,800,896 A | 4/1931 | Mitchell et al. | |
| 2,044,778 A | 6/1936 | Halstead | |
| 2,053,307 A | 9/1936 | Wilson | |
| 3,223,571 A * | 12/1965 | Straughan | 156/392 |
| 3,443,984 A | 5/1969 | Stewart | |
| 3,642,396 A | 2/1972 | Meneidis | |
| 3,657,000 A | 4/1972 | Kasano et al. | |
| 3,677,303 A * | 7/1972 | Martin | 285/47 |
| 3,687,765 A | 8/1972 | MacLean et al. | |
| 3,797,981 A | 3/1974 | Van Dijk | |
| 3,876,355 A | 4/1975 | Baughmann | |
| 3,982,050 A | 9/1976 | Kato et al. | |
| 3,985,483 A | 10/1976 | Clay et al. | |
| 4,169,906 A | 10/1979 | Hallstrom et al. | |

(Continued)

FOREIGN PATENT DOCUMENTS

CA 945019 4/1974

(Continued)

OTHER PUBLICATIONS

International Search Report for PCT/US2005/028226 mailed Apr. 1, 2006.

(Continued)

*Primary Examiner*—Christina Johnson  
*Assistant Examiner*—Galen Hauth  
(74) *Attorney, Agent, or Firm*—Ungaretti & Harris LLP (57) ABSTRACT

A system and method for insulating an outer surface of a fluid conduit is provided. A portion of the circumference of the outer surface of a conduit is surrounded in a film, thereby forming a generally annular pocket between the outer surface of the conduit and the inner surface of the film. Insulation is deposited into this pocket between the outer surface of the conduit and an inner surface of the film, molded to a substantially uniform radial thickness, and cured to form a cast molded conduit.

28 Claims, 5 Drawing Sheets

U.S. PATENT DOCUMENTS

| | | | |
|---|---|---|---|
| 4,218,350 A | 8/1980 | Griffin | |
| 4,259,137 A | 3/1981 | Kemmerling | |
| 4,366,972 A | 1/1983 | Franklin | |
| 4,417,603 A | 11/1983 | Argy | |
| 4,459,168 A | 7/1984 | Anselm | |
| 4,466,854 A | 8/1984 | Hawerkamp | |
| 4,515,737 A | 5/1985 | Karino et al. | |
| 4,515,832 A | 5/1985 | Roeder et al. | |
| 4,519,863 A | 5/1985 | Landgraf et al. | |
| 4,531,991 A * | 7/1985 | Ziemek et al. | 156/79 |
| 4,608,280 A | 8/1986 | Robinson et al. | |
| 4,645,553 A | 2/1987 | Languillat | |
| 4,673,541 A | 6/1987 | Watanabe et al. | |
| 4,729,807 A | 3/1988 | Hede et al. | |
| 4,755,334 A | 7/1988 | Grimm et al. | |
| 4,772,438 A | 9/1988 | Watanabe et al. | |
| 4,859,380 A | 8/1989 | Ogata | |
| 4,929,409 A | 5/1990 | Agren et al. | |
| 5,024,712 A | 6/1991 | Lecourt et al. | |
| 5,225,021 A | 7/1993 | Lona | |
| 5,290,632 A | 3/1994 | Jadhav et al. | |
| 5,417,786 A | 5/1995 | Denman et al. | |
| 5,439,711 A | 8/1995 | Vu et al. | |
| 5,464,886 A | 11/1995 | Tran et al. | |
| 5,534,299 A | 7/1996 | Eisen et al. | |
| 5,587,117 A | 12/1996 | Eisen et al. | |
| 5,601,881 A | 2/1997 | Grimm et al. | |
| 5,629,062 A | 5/1997 | Ejiri et al. | |
| 5,643,382 A | 7/1997 | Delimoy et al. | |
| 5,658,386 A | 8/1997 | Grimm et al. | |
| 5,939,145 A | 8/1999 | Oram | |
| 5,996,643 A * | 12/1999 | Stonitsch | 138/143 |
| 6,079,452 A | 6/2000 | Touzel et al. | |
| 6,174,478 B1 | 1/2001 | Silver | |
| 6,254,710 B1 | 7/2001 | Sekar | |
| 6,440,245 B1 | 8/2002 | Culzoni et al. | |
| 6,527,015 B2 * | 3/2003 | Lively | 138/149 |
| 6,539,999 B2 | 4/2003 | Polzin et al. | |
| 2002/0066521 A1 | 6/2002 | Sekar | |
| 2002/0101003 A1 | 8/2002 | DeMeyer | |
| 2003/0201060 A1 | 10/2003 | Hauber | |
| 2003/0209312 A1 | 11/2003 | Hauber | |

FOREIGN PATENT DOCUMENTS

| | | |
|---|---|---|
| EP | 0 523 509 A2 | 1/1993 |
| EP | 0 897 788 A1 | 2/1999 |
| FR | 5 578 026 | 8/1986 |
| FR | 1.602.896 | 5/1987 |
| FR | 2 589 981 | 5/1987 |
| GB | 913685 | 12/1962 |
| GB | 2 018 624 A | 10/1979 |
| GB | 2 165 772 A | 4/1986 |
| JP | 58-122078 | 7/1983 |
| JP | 60150053 | 12/1985 |
| JP | 62266175 | 5/1988 |
| WO | WO 90/06185 | 6/1990 |

OTHER PUBLICATIONS

"Polypropylene System Scores High as Pipeline Anti-corrosion Coating"; Oil & Gas Journal; pp. 42-45; Dec. 14, 1992.

"Walzen mit PUR-Elastomeren Beschichten"; Kunststoffe; pp. 958-960; 1992.

"Turnkey Coating System Covers Pressure Gas Pipe"; Peter Mapelston, Modern Plastics International, vol. 23, No. 7, Jul. 1993, Lausanne Ch, pp. 20-22.

* cited by examiner

METHOD AND SYSTEM FOR CAST MOLDING A FLUID CONDUIT

CROSS-REFERENCE TO RELATED APPLICATIONS

This application claims the benefit of U.S. Provisional Application No. 60/601,470, filed on Aug. 13, 2004, which is incorporated herein by reference.

FEDERALLY SPONSORED RESEARCH OR DEVELOPMENT

Not Applicable.

TECHNICAL FIELD

The invention relates to cast molding, and more particularly, to a system and method for molding an insulation and an optional protective coating for a fluid conduit such as a pipe.

BACKGROUND OF THE INVENTION

Oil and gas exploration and development companies have improved both their exploration techniques and their production techniques to tap deep-water oil reserves, such as in oceans, bays and gulfs. This effort has prompted the need for insulation systems for fluid conduits (i.e., pipes), called flow assurance lines (flowlines), which meet U-value requirements in colder temperatures at great depths and increased hydrostatic pressures at great depths. "Pipe-in-Pipe" insulation systems have been used, and will continue to be used, to meet these purposes and needs. However, newer insulation technology has been developed to create a "wet" insulation system that can be directly applied to a pipe or flowline and does not require a protective casing pipe. This insulation technology is gaining interest and market share in the industry.

The present invention provides a processing system and method to serve this need and to improve upon the techniques for insulating such flowlines or conduits. A full discussion of the features and advantages of the present invention is described below in the detailed description, with reference to the accompanying drawings.

SUMMARY OF THE INVENTION

The present invention is directed to a system and method for insulating an outer surface of a fluid conduit. According to one aspect of the present invention, a portion of the circumference of the outer surface of the conduit is surrounded in a film, thereby forming a generally annular pocket between the outer surface of the conduit and an inner surface of the film. Insulation is then deposited in the annular pocket between the outer surface of the conduit and an inner surface of the film. The insulation is next molded to a substantially uniform radial thickness and cured to form a cast molded conduit. This molding may occur in either a static or a progressive mold.

According to another aspect of the present invention, a polyethylene coating may be extruded around a portion of the cast molded conduit and film. Alternatively, the film may be removed from the cast molded conduit.

According to still another aspect, the insulation is glass syntactic polyurethane and the film is polyethylene.

According to yet another aspect of the present invention, the method for insulating the outer surface of a fluid conduit is used in connection with a molding system. The molding system comprises a mold having a first and second end and at least two rolls of film. The rolls of film are disposed proximate the first end of the mold, and each of the rolls of film is defined by a sheet of film. The sheets of film have a top and bottom edge.

A conduit is fed into and through the mold in an axial direction. As the conduit is fed into the mold, a leading edge of the conduit pulls the both films in the axial direction therewith. A portion of either the top or bottom edges of the two film sheets are seamed before that portion enters the mold. This causes a generally annular pocket to be formed between an outer surface of the conduit and an inner surface of the film. An opening for receiving insulation is defined by the opposed unseamed edges of the film. Insulation is then deposited into the pocket between the inner surface of the film and the outer surface of the conduit. The corresponding portion of the other edges of the film (i.e., the open end of the pocket) is then seamed. The insulation is then molded to a substantially uniform radial thickness and cured to form a cast molded conduit.

According to still another aspect of the present invention, a fluid conduit is provided. The fluid conduit comprising an outer conduit surface and an insulating surface disposed on the outer conduit surface. The insulating surface is formed by surrounding an outer circumference of the conduit in a polyethylene film to form a generally annular pocket between the outer surface of the conduit and an inner surface of the polyethylene film. Glass syntactic polyurethane insulation is deposited between the outer surface of the conduit and an inner surface of the polyethylene film, and the insulation is molded to a substantially uniform radial thickness. The conduit can also include a polyethylene coating disposed on the insulating surface.

According to yet another aspect of the present invention, a molding system for cast molding an insulated fluid conduit is provided. The molding system comprises a conveyor or other known suitable mechanism for axially translating a fluid conduit, a mold, first and second roll stands, first and second seamers at least one insulation dispenser. The mold defines a mold cavity and having a first and second end. The first and second roll stands are vertically disposed and are provided to dispense a first and second roll of film sheets. The first and second roll stands are disposed proximate the first end of the mold and on opposed sides thereof. The first seamer seals opposed bottom edges of a pair of film sheets, and the second seamer seals opposed top edges the film sheets. The second seamer is disposed closer to the first end of the mold than the first steamer. The insulation dispensers are disposed between the location of the first and second seamer.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

According to the present invention a linear molding system 10 is provided. The molding system 10 is provided to apply insulation 16, and more particularly, glass syntactic polyurethane (GSPU) insulation 16, to a fluid conduit 12. Typically, a fluid conduit (e.g., pipes) 12 according to the present invention has a nominal diameter of between 4" and 12" and comprise an outer conduit surface 14 and an insulation layer 16 disposed on the outer conduit surface 14.

As will be described in detail herein, the insulation layer 16 is formed by surrounding the outer conduit surface 14 in a film 18 to form a generally annular pocket 20 between the outer conduit surface 14 and an inner surface of the film 18. Insulation 16, preferably a glass syntactic polyurethane, is deposited onto the film 18 in the pocket 20, thereby creating an insulation layer 16. The insulation 16 is then molded in accordance with methods described herein to a substantially uniform radial thickness.

As shown in FIGS. 1-5, the molding system 10 for producing the insulated fluid conduit 12 comprises a means 22 for axially translating the conduit 12, first and second roll stands 24, first and second seamers 26,28, at least one insulation dispenser 30,32, and a conduit mold 38.

The means 22 for axially translating the conduit 12 downstream is preferably a conveyor system as will be understood to be conventional and well known to those in the art. For example, the conveyor system may be comprised of conventional belts, hourglass rollers or rotatable tires arranged to secure and advance the conduit 12 into and through the molding system 10. While the preferred means 22 is a conveyor system, it will be understood that the means 22 for axially translating the conduit 12 may also be other systems known to those of skill in the art to provide axial translation of an article. For example, the means 22 may be a pneumatic bed, a crane system, a gravity feed system or an input system in which the conduit 12 is manually translated into and through the molding system 10. Preferably, the translational means 22 prevents the conduit 12 from rotating about its cylindrical axis (y) as it is translated axially through the molding system 10.

Figure 1:
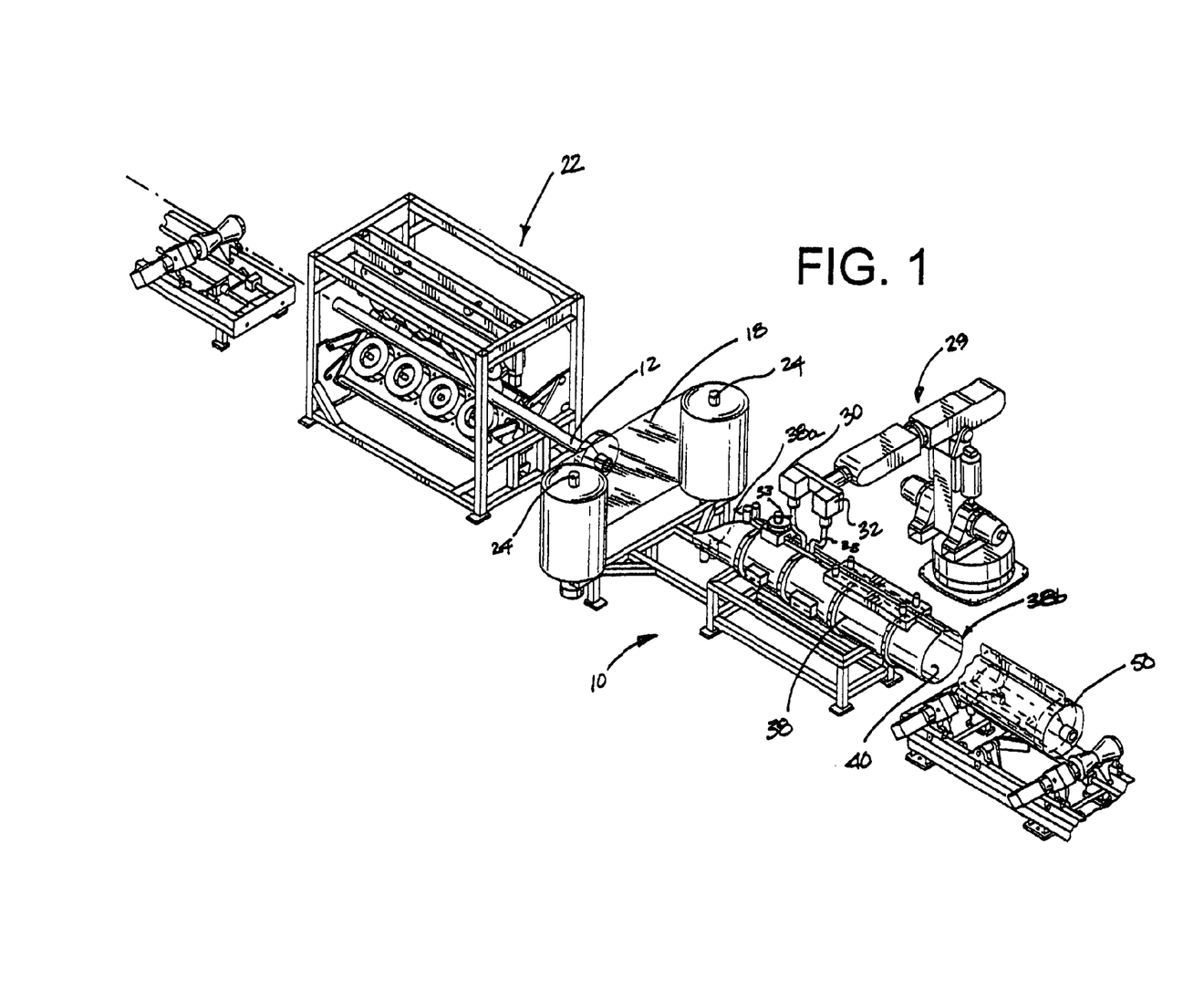
FIG. 1 is a perspective view of the molding system according to the teachings of the present invention.
Figure 5:
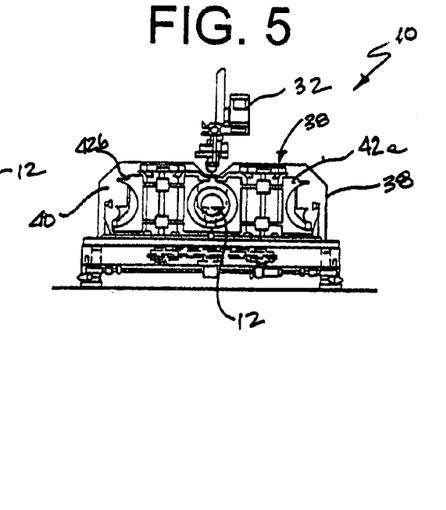
FIG. 5 is a front elevation view of the system of FIG. 3.
Figure 6:
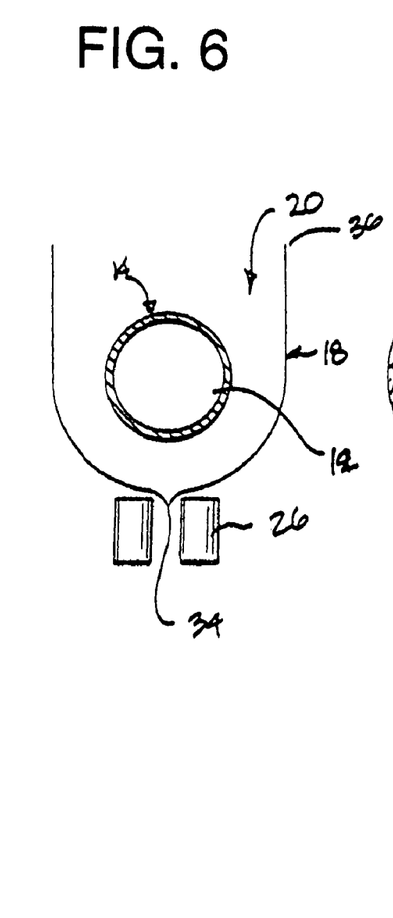
FIG. 6 is a partial schematic end view of one progressive step of the method of dispensing insulation according to the teachings of the present invention.
Figure 7:
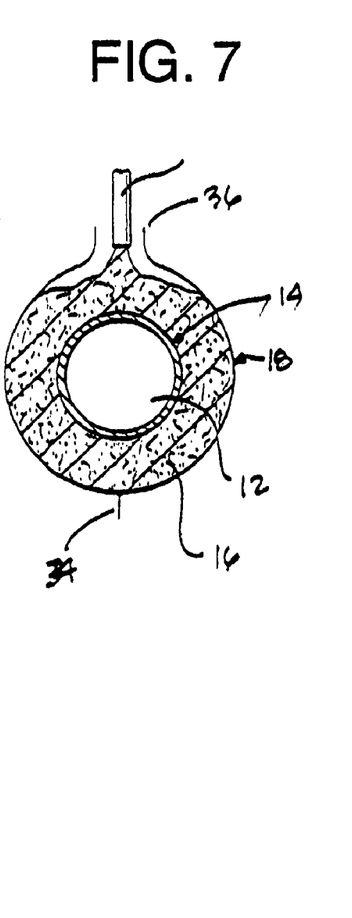
FIG. 7 is a partial schematic end view of another progressive step of the method of dispensing insulation of FIG. 6.
Figure 8:
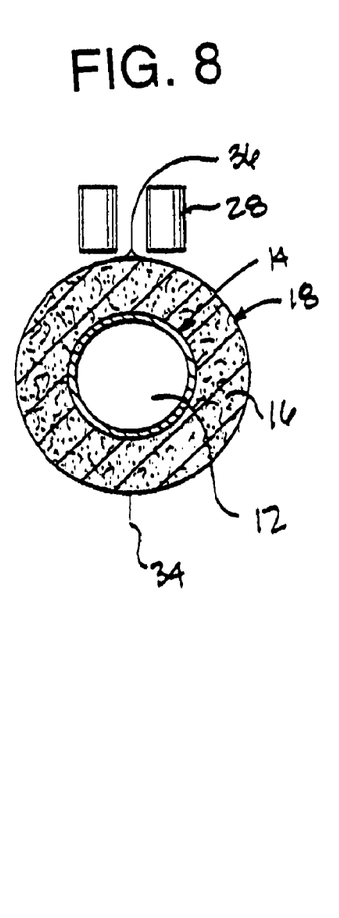
FIG. 8 is a partial schematic end view of another progressive step of the method of dispensing insulation of FIG. 6.
Figure 9:
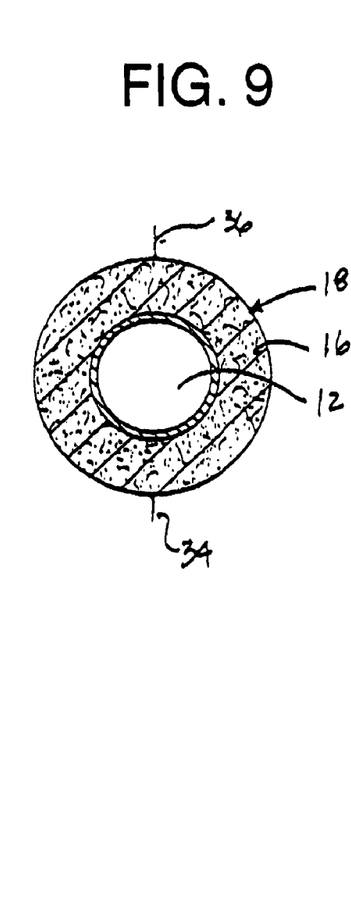
FIG. 9 is a partial schematic end view of another progressive step of the method of dispensing insulation of FIG. 6; and, FIG. 10 is a perspective view of the starter ring according to the present invention.

According to one embodiment of the present invention, first and second roll stands 24 are provided for dispensing rolled sheets of film 18. Generally, the film 18 has an inner side, an outer side, a bottom edge 34 and a top edge 36. As may be seen in FIGS. 1, 2, 3 and 4, the roll stands 24 are disposed upstream and on opposed sides of a first end of the mold 38a. While FIGS. 1 and 5 show the roll stands 24 being vertically disposed in an upright position, it is understood the roll stands 24 may be aligned at any orientation suitable for positioning the roll stands 24 and on opposed sides of a first end of the mold 38a. For example, the roll stands 24 may be disposed parallel to a floor surface to accommodate a horizontal feed of the film 18. It is further contemplated that the present molding system 10 can employ a single roll stand 24 without departing from the present invention.

Figure 2:
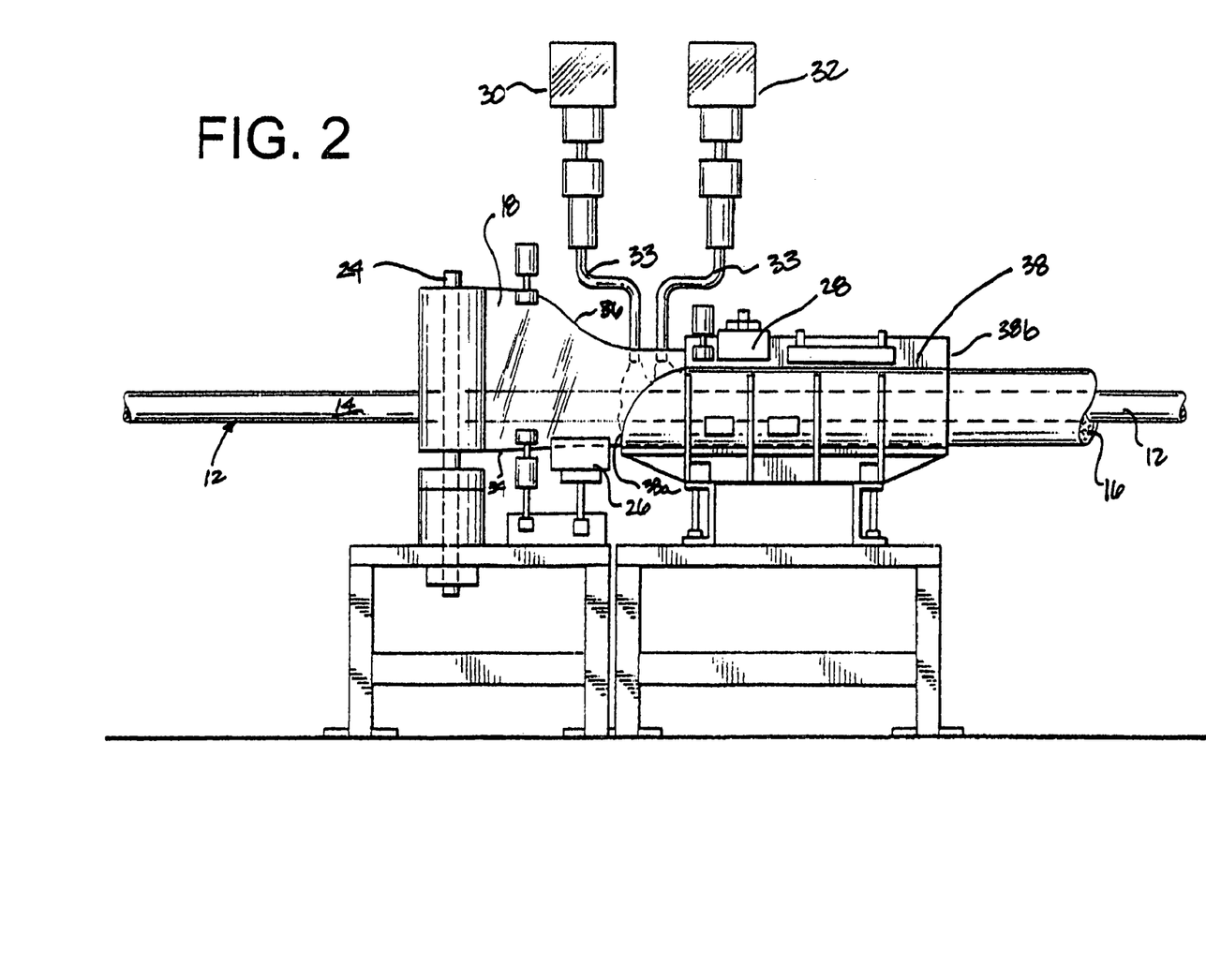
FIG. 2 is a partial side elevation view of the system of FIG. 1.
Figure 3:
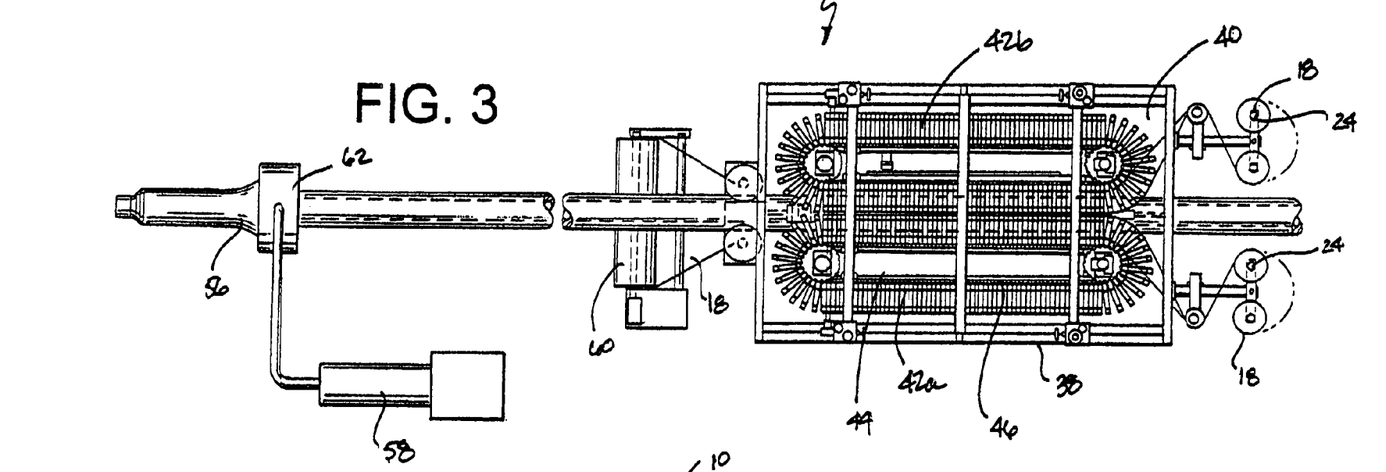
FIG. 3 a top plan view of another embodiment of the molding system according to the teachings of the present invention.
Figure 4:
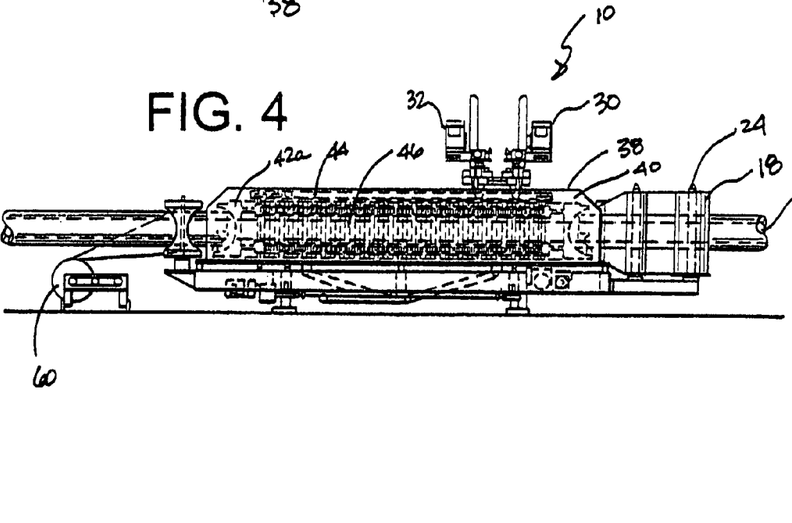
FIG. 4 is a partial side elevation view of the system of FIG. 3.

As shown in FIG. 2, first and second seamers 26,28 are provided downstream of the roll stands 24. In one embodiment, the first seamer 26 is provided to seal the bottom edges 34 of the film sheets one with the other, and the second seamer 28 is provided to seal the top edges 36 of the film sheets one with the other. The second seamer 28 is preferably positioned downstream of the first seamer 26. According to the present invention, the seamers comprise three pairs of mechanically actuated rollers mounted opposite one another and perpendicular to a centerline of travel of the film 18. Each roller is mounted on a track that can be extended or retracted. When the rollers are extended, the rollers contact one another.

In operation, the film 18 is placed between the rollers and is held by the contacting surfaces of the rollers. The leading set of rollers guide the film 18 into a sealer. The middle set of rollers provide the heat seaming using a hot plate type heater over which the sealer rollers ride. The hot plate and sealer rollers are mounted on a mechanically controlled track that can extend or retract. When the set of rollers are extended, the heated rollers contact one another. The film 18 is rolled between the heated rollers and the edges 34,36 of the film 18 melt together. A solid state temperature controller controls the roller temperature. Feedback control is obtained by a thermocouple connected to the hot plate heater that sends the signal to the solid state controller to maintain the set-point temperature.

A trailing set of rollers is mounted downstream of the heat sealer roller set. Each roller is mounted on a track that can be extended or retracted. When the rollers are extended, the rollers contact one another. The film 18 moves between the rollers and is held by the contacting surfaces of the rollers. The trailing rollers maintain the positioning of the film 18 and cool the film 18 below the softening point. Additionally, pinch rollers can be employed to guide the film 18 to the seamers 26,28 and to aid in maintaining the correct tracking of the film 18.

At least one insulation dispenser 30,32 or dispensing head, is provided in accordance with the present invention. According to the present invention, the dispensing heads 30, 32 can be used independently or together. Each dispensing head 30,32 is comprised of a high speed mixing motor, a mixer shaft and agitator, a mixing chamber, a chamber outlet, at least one dispensing tube, and mix valves to control the fluid ingress into the mix chamber.

Generally, the dispensing heads 30,32 are capable of mixing multiple fluid streams in the mix chamber. In one preferred embodiment of the present invention, the dispensing heads 30,32 accommodate a stream of each of polyol, isocyanate and a catalyst. The mixer motor spins the mixer shaft and agitator. The chamber outlet controls the backpressure in the mixer, and the dispenser tubes provide a control location for precision dispensing. The mix heads may be of the type manufactured by Edge-Sweets, Inc, Grand Rapids, Mich. under the product code M-500 or any other mix heads suitable for the present application. Preferably, however, the dispensing heads 30,32 used in connection with the present invention are capable of operating at 3 HP with a maximum of 6500

RPM. It is also preferable that the dispensing heads 30,32 be capable of dispensing 50 lb/min. of insulation material. Nonetheless, it will be understood by one of skill that any size mixer suitable for use with the present.

As may be seen in FIG. 2, the insulation dispenser 30,32 is disposed between the first and second seamer 26,28. Preferably, two insulation dispensers 30,32 are employed. As depicted in FIG. 2, the dispensers 30,32 may be operably attached to an automated arm 29 that is capable of movement in various directions, and thus capable of directing flow of the insulated materials in a desired direction of location. The automation for driving such an arm 29 will be known to those of skill in the art. In employing the present method, each cross-section of insulation may require a different dispensing head position as a result of differing masses involved in thicker or thinner insulation systems. Accurate and repeatable material deposition is necessary to obtain optimal characteristics in the finished product, including both physical and cosmetic properties. Thus, the control of the dispensing heads 30,32 is important to the present method. According to a preferred embodiment of the present invention, the automated arm 29 is calibrated to dispense material repeatable to 0.5 mm.

A mold 38 is provided to confine the film 18 and the insulation 16 disposed between the film and the pipe as the insulation 16 cures. The mold 38 employed in connection with the present invention is defined by a mold cavity 40 and has a first and second end. When applying insulation 16 of under 3" thickness, the mold 38 is preferably static in that it is not configured to move with the pipe. Accordingly, the mold 38 remains stationary while the pipe is moved through the mold 38. When applying insulation 16 of greater than 3" thickness, it is preferable that both the pipe and the mold 38 travel together or are synchronized. Nevertheless, it is understood one can use a static mold for insulation 16 having a thickness greater than 3" and a moving mold for insulation 16 less than 3" thick.

The automated arm 29, in conjunction with starter ring 50 and ending ring 50, provide the ability to fashion a prefinished cut-back area at each end of the fluid conduit 12. This minimizes or eliminates the need for milling and removal of the insulation 16 in the cut-back area. Thus, the time required for removal and the insulation material 16 that otherwise would have been deposed into the cut back area will have been saved.

The mold cavity 40 of one embodiment of present invention includes a plurality of first side mold sections 42a and a plurality of second side mold sections 42b. Each of the mold sections 42a,42b has a semi-cylindrical recess for shaping the insulation 16 disposed between the conduit 12 and film 18. Each of the mold sections 42a,42b are attached by a mold holder 44 to a recycling conveyor chain 46 or similar linking mechanism and are thus moveable within the mold cavity 40. Preferably the continuous molds are moveable at the same speed as the conduit 12 as it moves axially downstream through the mold 38 as described herein. Generally, in such a system, the conveyor chain 46 has a separate motor (not shown) from the motor that powers the means 22 for axially translating the conduit 12. The motor for driving the chain within the mold 38 is synchronized with the motor for translating the conduit 12. It is also contemplated, however, that the same motor be employed to operate both systems without departing from the present invention.

According to a method of manufacturing an insulated conduit 12 according to the method of the present invention, a conduit 12 is fed into and through the mold 38 in an axial direction. As the conduit 12 is axially transported downstream, a leading edge (the front end) of the conduit 12 engages a sheet of film 18 spread across the path of travel of the conduit 12. Although the film 18 is preferably polyethylene, the film 18 may be formed from any material suitable for withstanding the thermal and chemical properties of the insulation 16.

Figure 10:
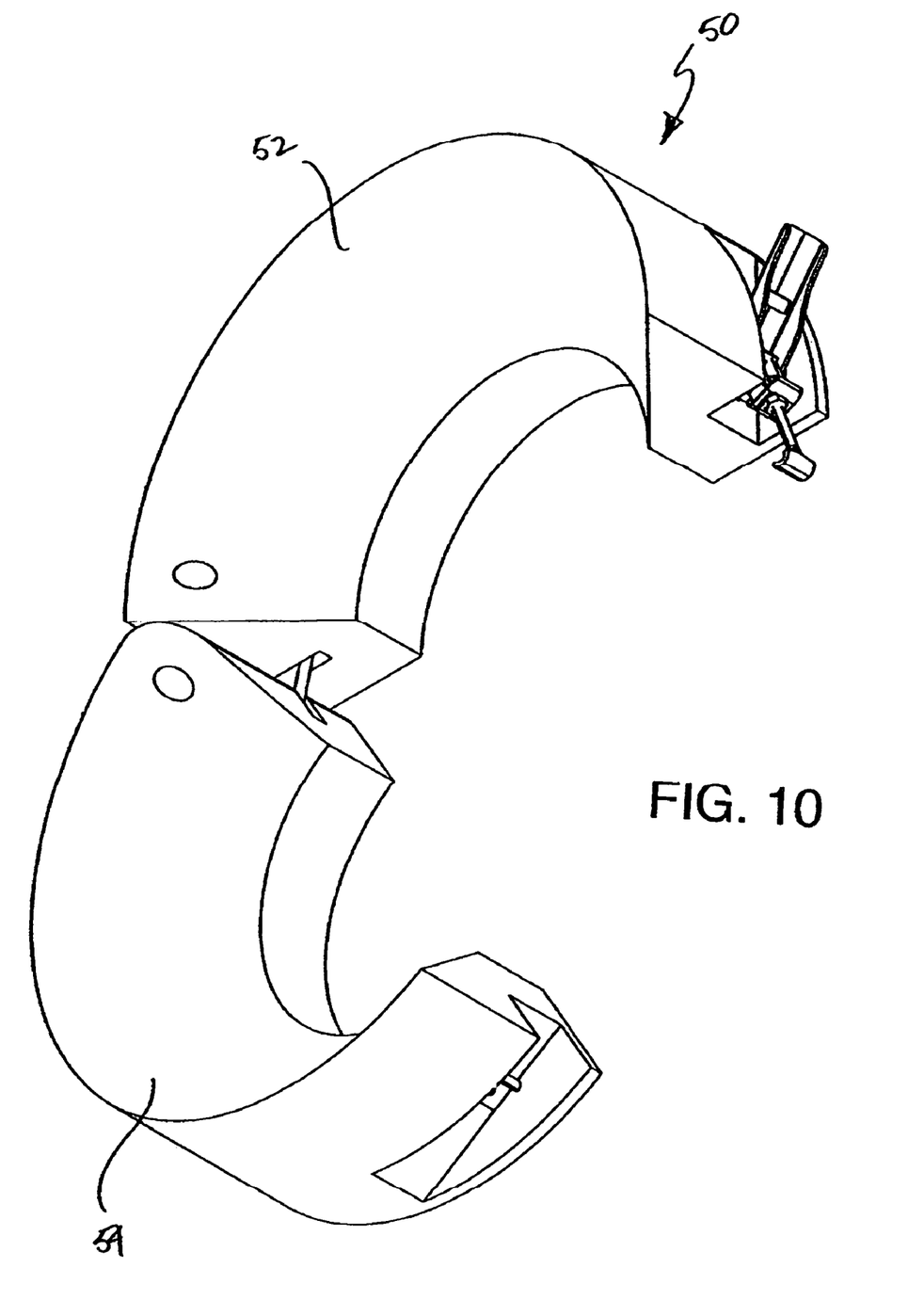

As the conduit 12 travels along its path, the conduit 12 pulls the film 18 in the axial direction therewith. Alternatively, a starter ring 50 is attached to the pipe at the front end proximate a leading edge of the pipe as shown in FIG. 1. According to such an embodiment, the starter ring 50 is comprised of first and second mating ring 52,54 (FIG. 10). The first mating ring 52 is attached to the leading edge of the conduit 12 and the second mating ring 54 is coupled to the first mating ring, with the film 18 being disposed therebetween. Accordingly, the starter ring 50 circumferentially secures the film 18 to the front end of conduit 12 and helps to facilitate translation of the film 18 with the conduit 12. The starter ring 50 can also act as a seal to prevent leakage of insulation 16 as described in further detail below. The starter ring 50 may also be used at the back or rear of the pipe, that being the trailing edge of the pipe, to seal the insulation 16 between the conduit 12 and the film 18 along the entire length of the conduit 12. The starter ring 50 also creates a shaped cut-back area at an ends of the resulting insulated conduit 12. Having cut-back areas, can eliminate the need for subsequent milling wherein material is cut away from the insulated pipe.

Before the translating conduit 12 and film 18 enter the mold, the first seamer 26 begins to seam a portion of the bottom edges 34 of the film 18, thereby fusing one to the other. Seaming the bottom edges 34 of the film 18, forms a generally annular pocket 20 between the outer surface 14 of the conduit and the inner surface of the film 18. This creates a U-shaped configuration in which an opening is defined by the opposed unseamed edges of the film 18.

Before the conduit 12 and film 18 pass into the mold 38 cavity, and before the film 18 entirely envelopes the circumference of the conduit 12, the insulation 16 is deposited by the dispensing tubes 33 into the pocket 20 formed between the inner surface of the film 18 and the outer surface 14 of the conduit 12. When a system 10 is employed in which there exists two dispensing tubes 33, the step of depositing insulation 16 into the pocket 20 comprises a first depositing step and a second depositing step. During the first depositing step, a first layer of insulation 16 is deposited into the pocket 20 and during the second depositing step, a second layer of insulation 16 is deposited into the pocket 20. It is preferable that the insulation 16 deposited into the pocket 20 is synchronized with the rate at which the conduit 12 is axially fed downstream into the mold 38 to optimize the consistency of the thickness of the insulation 16 being deposited.

Preferably, the insulation 16 is deposited into the pocket 20 at with volume of insulation 16 sufficient to form an insulating layer having a thickness of between 0.75 to 4 inches. However, an insulating layer of any suitable thickness may be formed without departing from the present invention. Thus, a corresponding appropriate volume of insulation 16 may be dispensed It has also been found that dispensing material onto the film 18 and below the conduit 12 enhances the consistency of the insulation 16. The dispensing tubes 33 facilitate directional dispensing of the insulation 16. In this manner the insulation 16 may be dispensed on each of the sides of the conduit 12 and into the pocket 20 formed between the conduit 12 and film 18, or positioned to any desired location. While it is preferable that the insulation 16 is not dispensed directly onto the conduit 12, it is contemplated that the insulation 16 can be applied directly to the conduit 12 or in any manner suitable to surround the outer circumference of the conduit 12 without departing from the present invention.

As the conduit 12 moves into the mold cavity 40, the second seamer 28 seams the top edges 36 of the film 18 one to the other, thereby encasing the insulation 16 between the inner surface of the film 18 and the outer surface 14 of the conduit 12. If employed, starter ring 50 prevents the insulation 16 from escaping near the leading edge (and trailing edge) of the conduit 12.

When the sealed conduit 12 enters the mold cavity 40, the conduit 12 and insulation 16 are molded to a substantially uniform radial thickness. Specifically, the mold elements within the mold cavity 40 surround the conduit 12 and shape the insulation 16 therearound. The insulation 16 is then cured to form a cast molded conduit 12.

The present continuous cast process provides benefits over previously employed methods and systems. Specifically, the casting can be visually inspected during the pour operation. Additionally, the present continuous casting process results in a casting that prevents or minimizes cold lap seams. In other words, all material is cast "wet into wet," and the added layers bond together with the previous layers to form a homogeneous whole. Because the gel time of the insulation occurs after the material has filled the mold cavity completely, all the wet cast material knits together. Additionally, the present method and system can be operated at various speeds, reducing overall set-up and processing time for a project.

After the curing process, a polyethylene coating (PE) 56 may be extruded around the cast molded conduit 12, thereby obtaining a fully boded GSPU conduit 12 with a PE jacket. The polyethylene coating or jacket is preferably extruded through a stationary extruder 58 position downstream of the mold 38 and applied using a cross head die 62. However, it will be understood that any other extruding system may be employed without departing from the present invention.

Alternatively, the film 18 may be removed from the cast molded conduit 12 after the curing process is completed. The film 18 can be peeled off of the cast molded conduit 12 using a take up spool 60 positioned downstream of the mold 38.

While the specific embodiments have been illustrated and described, numerous modifications come to mind without significantly departing from the spirit of the invention, and the scope of protection is only limited by the scope of the accompanying Claims.

What is claimed is:

1. A method for insulating an outer surface of a conduit comprising:
    surrounding a portion of a circumference of an outer surface of the conduit within a film to form a pocket between the outer surface and an inner surface of the film, the pocket having an opening along an axial direction to expose the outer surface of the conduit;
    attaching a starter ring about a front end of the conduit proximate a leading edge of the conduit, the starter ring having a diameter greater than the conduit wherein the starter ring engages the inner surface of the film within the pocket;
    depositing an insulation into the pocket through the opening in the pocket subsequent to attaching the starter ring;
    continuously molding the insulation to a substantially uniform radial thickness; and
    curing the insulation to form a cast molded conduit.

2. The method of claim 1 further including the step of extruding a polyethylene coating around at least a portion of the insulation.

3. The method of claim 1 further including the step of removing the film from the conduit.

4. The method of claim 1 wherein the step of depositing insulation comprises depositing a volume of insulation to form an insulating layer having a thickness of around 0.75 inches to 4 inches.

5. The method of claim 1 wherein the step of depositing insulation comprises a first depositing step and a second depositing step, wherein a first layer of insulation is deposited into the pocket during the first depositing step and a second layer of insulation is deposited into the pocket during the second depositing step so as to form two layers of insulation, the two layers being bonded together to form a homogenous whole.

6. The method of claim 1 wherein the insulation is glass syntactic polyurethane.

7. The method of claim 1 wherein the film is polyethylene.

8. The method of claim 1 wherein the step of molding the insulation occurs in a static mold.

9. The method of claim 1 wherein the step of molding the insulation occurs in a progressive mold.

10. A method for insulating an outer surface of a conduit comprising the steps of:
    feeding a conduit into and through a mold having a first and second end in an axial direction such that a leading end of the conduit pulls a film in the axial direction therewith;
    seaming a portion of the film before the portion enters the mold to form a generally annular pocket between an outer surface of the conduit and an inner surface of the film and an opening defined by the opposed unseamed edges of the film;
    depositing insulation into the pocket;
    seaming a corresponding portion of the film adjacent the insulation;
    continuously molding the insulation disposed in the pocket to a substantially uniform radial thickness; and
    curing the insulation to form a cast molded conduit.

11. The method of claim 10 wherein the rate at which the insulation is deposited into the pocket is synchronized with the rate at which the conduit is axially fed into the mold.

12. The method of claim 10 wherein the step of depositing insulation into the pocket comprises depositing a volume of insulation to form an insulating layer having a thickness of about 0.75 inches to 4 inches.

13. The method of claim 10 wherein the step of depositing insulation comprises a first depositing step and a second depositing step, wherein a first layer of insulation is deposited into the pocket during the first depositing step and a second layer of insulation is deposited during the second depositing step so as to form two layers of insulation.

14. The method of claim 10 wherein during the feeding step the conduit is generally free of rotational movement about a cylindrical axis of the conduit.

15. The method of claim 10 further including the step of extruding a polyethylene coating around at least a portion of the conduit with insulation thereon.

16. The method of claim 10 further including the step of removing the film from the cast molded conduit.

17. The method of claim 10 wherein the insulation is glass syntactic polyurethane.

18. The method of claim 10 wherein the film is polyethylene.

19. The method of claim 10 further including the step of circumferentially securing the film proximate the leading end of the conduit before the feeding step.

20. The method of claim 19 wherein the film is secured proximate the leading end of the conduit by a starter ring comprising first and second mating ring members.

21. The method of claim 10 wherein the step of molding the insulation occurs in a static mold.

22. The method of claim 10 wherein the step of molding the insulation occurs in a progressive mold.

23. The method of claim 1 further comprising the step of:
attaching an ending ring about a back end of the conduit proximate a trailing edge of the conduit, the ending ring having a diameter greater than the conduit wherein the ending ring engages the inner surface of the film within the pocket.

24. The method of claim 23 wherein the starting and ending rings act as seals at the front and back ends of the conduit, respectively, to prevent leakage of insulation between the conduit and the film along the entire length of the conduit.

25. The method of claim 23 wherein the starting and ending rings have an outwardly tapered configuration angling outwardly from a radially inner portion adjacent the outer surface of the conduit to a radially outer portion located adjacent the inner surface of the film.

26. A method for insulating an outer surface of a conduit comprising:

attaching a starter ring about a front end of a conduit proximate a leading edge of the conduit, the starter ring having a diameter greater than the conduit;
surrounding a portion of a circumference of an outer surface of the conduit within a film to form a pocket between the outer surface and an inner surface of the film, the pocket having an opening to expose the outer surface of the conduit wherein the starter ring engages the inner surface of the film within the pocket;
depositing an insulation into the pocket through the opening in the pocket;
continuously molding the insulation to a substantially uniform radial thickness;
curing the insulation to form a cast molded conduit; and
removing the starter ring subsequent to the curing step.

27. The method of claim 26 further comprising the step of:
attaching an ending ring about a back end of the conduit proximate a trailing edge of the conduit, the ending ring having a diameter greater than the conduit wherein the ending ring engages the inner surface of the film within the pocket.

28. The method of claim 27 wherein the starting and ending rings are annular.

* * * * *